Dec. 19, 1967   D. S. CHISHOLM ET AL   3,358,749
INTERFACIAL SURFACE GENERATOR AND METHOD OF PREPARATION THEREOF
Filed July 22, 1966
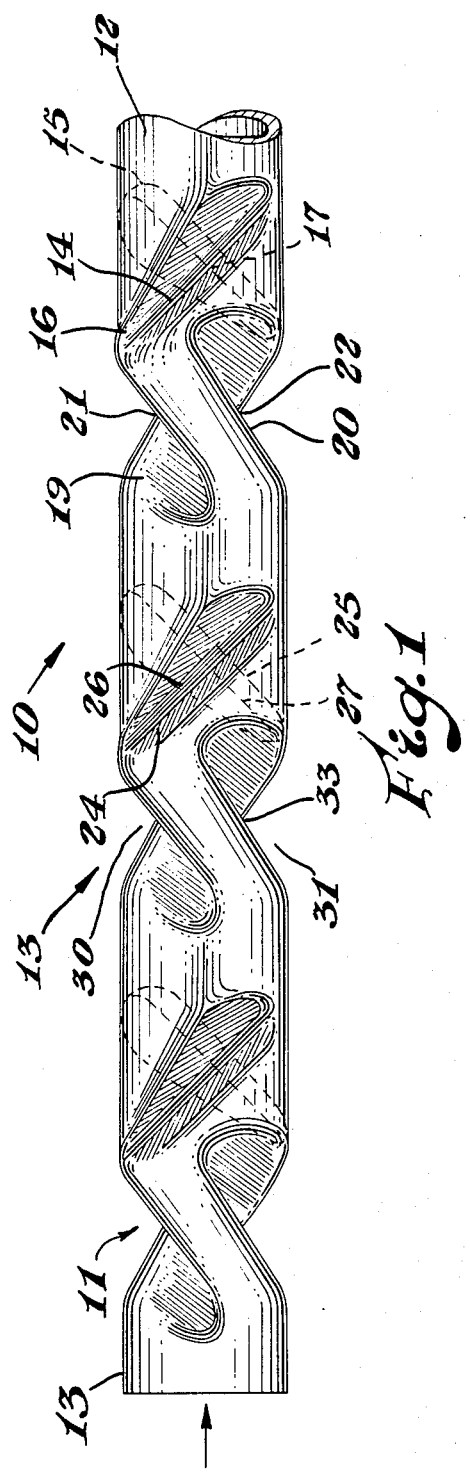
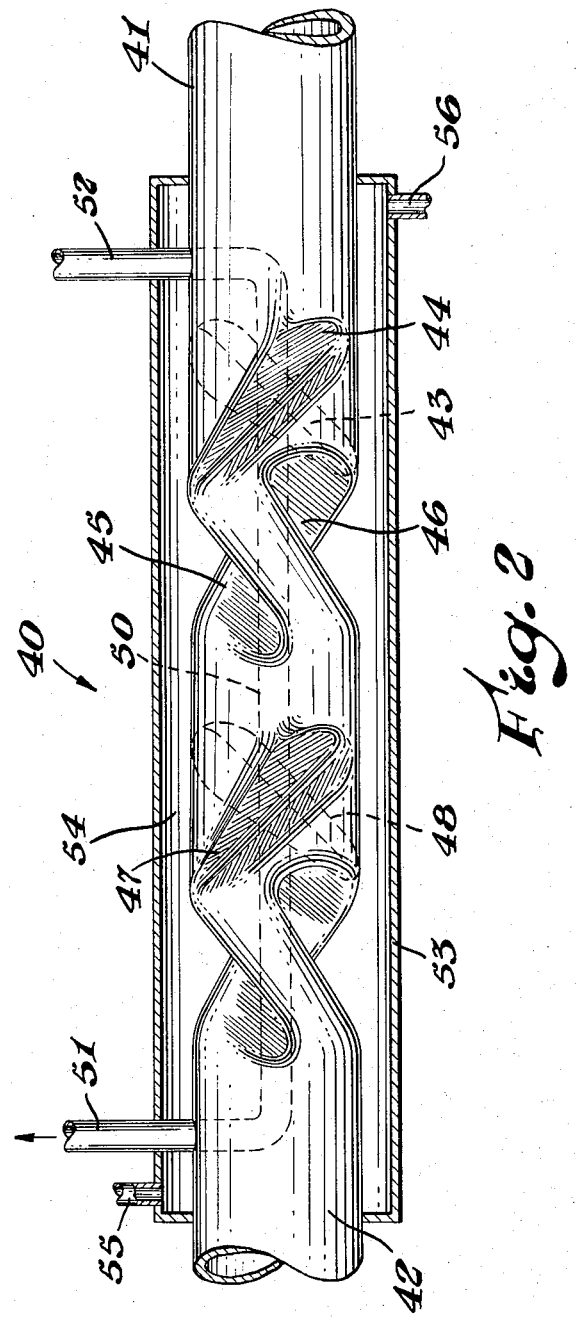
INVENTORS.
Douglas S. Chisholm
BY Turner Alfrey, Jr.
AGENT United States Patent Office 3,358,749
Patented Dec. 19, 1967

3,358,749
INTERFACIAL SURFACE GENERATOR AND
METHOD OF PREPARATION THEREOF
Douglas S. Chisholm and Turner Alfrey, Jr., Midland,
Mich., assignors to The Dow Chemical Company, Midland, Mich., a corporation of Delaware
Filed July 22, 1966, Ser. No. 567,168
5 Claims. (Cl. 165—141)

ABSTRACT OF THE DISCLOSURE

A static element mixing tube is provided which, by employing opposed crimps of alternating hand, provides a mixing action by repositioning of stream parts. Mixing action below the flow turbulence is generally independent of throughput.

This invention relates to an interfacial surface generator and a method for the preparation of interfacial surface generators.

The term "interfacial surface generator" is employed herein to describe a static mixing element through which a stream of liquid gas or particulate solids may be passed and the configuration of the generator is such that the stream is divided and recombined to provide mixing.

Several varieties of such mixers are known and disclosed in U.S. Letters Patent 3,051,452, 3,051,453, 3,182,965 and 3,195,865. Such interfacial surface generators are generally obtained by providing a baffle or stream deflecting element of a specific configuration within a conduit or passageway. Frequently, such interfacial surface generators require machining of blocks, molding, casting or sheet fabrication to obtain baffles of the desired configuration.

It would be desirable if there were available an interfacial surface generator prepared from a single deformable conduit.

It would also be desirable if there were available a method for the preparation of such an interfacial surface generator from a single deformable conduit.

It would also be desirable if a method were available for the preparation of a deformed conduit which would function as an interfacial surface generator.

These benefits and other advantages in accordance with the present invention are achieved in a method for preparing an interfacial surface generator, the steps of the method comprising providing a hollow tubular conduit having a deformable wall; deforming the wall of the conduit to form therein a first crimp; the first crimp extending inwardly into the conduit for a distance about equal to the radius of the conduit; the first crimp being arbitrarily designated as a right handed crimp and being disposed at an angle of substantially less than 90° with the longitudinal axis of the conduit; forming a second crimp oppositely disposed to the first crimp; the second crimp having a right handed configuration; the first and second crimps each having a trough and a portion of the trough of the first and second crimps being disposed adjacent each other; the first and second crimps where the troughs approach each other dividing a passageway defined within the hollow tubular conduit into first and second portions; forming within the wall of the conduit generally adjacent the first and second crimps third and fourth crimps having left-handed orientation and being generally mirror images; the third and fourth crimps having troughs which approach each other within the conduit and divide the passageway within the conduit into third and fourth portions; the troughs of the third and fourth crimps being disposed about 90° from the troughs of the first and second crimps; forming fifth and sixth crimps disposed in the manner substantially similar to the configuration of the first and second crimps and being disposed adjacent the third and fourth crimps and having troughs generally parallel to the troughs of the first and second crimps.

Also contemplated within the scope of the present invention is an interfacial surface generator comprising a hollow tubular conduit defining an interior longitudinal passageway; the conduit having a wall; the wall defining a plurality of opposed crimps disposed in angular relationship to the longitudinal axis of the conduit; the crimps having troughs; a portion of each of the troughs being in closely adjacent relationship; the opposed pairs of crimps being of alternating right-handed and left-handed configuration; the right handed and left handed crimps being disposed generally in planes which contain the longitudinal axis of the conduit and the plane of the right handed crimps being disposed in angular relationship to the left-handed crimps.

Further features and advantages of the present invention will become more apparent from the following specification when taken in connection with the drawing wherein:

In FIGURE 1 there is schematically depicted an interfacial surface generator in accordance with the invention.

In FIGURE 2 there is shown an alternate embodiment of the invention.

In FIGURE 1 there is illustrated a schematic partially cut-away view of a mixer generally designated by the reference numeral 10 in accordance with the invention. The mixer 10 comprises a tubular body 11 having a first end 12 and a second end 13. The tubular body 11 has a mixing portion 13. The mixing portion 13 defines a first crimp 14 which is disposed in angular relationship to the longitudinal axis with the conduit or body 11. A second crimp 15 is oppositely disposed to the crimp 14 to form a first pair of opposed crimps. Arbitrarily, the crimps 14 and 15 are designated as right-handed crimps. The crimps 14 and 15 have troughs or peaks 16 and 17, respectively. The term "trough" or "peak" is relative. If the crimp is view externally from the body 12, it is a trough; if viewed internally, it is a peak. The peaks 16 and 17 closely approach each other and beneficially are in contact. A second pair of crimps or deformations of the conduit 11 designated by the reference numerals 19 and 20 are disposed adjacent the first pair of crimps 14 and 15. The crimps 19 and 20 are of left handed configuration, that is, they are in essence a mirror image of the crimps 14 and 15 wherein a plane of symmetry is disposed parallel to the axis of the conduit and external thereto. The crimps 19 and 20 are formed within the conduit 11 and the peaks or troughs 21 and 22, respectively. The peaks 21 and 22 are disposed generally parallel to a plane containing the longitudinal axis of the conduit and in a plane which is generally normal to a plane passing through the longitudinal axis of the conduit and containing the peaks 16 and 17 of the crimps 14 and 15. Disposed generally adjacent the second pair of opposed crimps 19 and 20 is a third pair of opposed crimps 24 and 25. The crimps 24 and 25 have peaks or troughs 26 and 27, respectively. The peaks 26 and 27 of the crimps 24 and 25 are disposed in angular relationship to the longitudinal axis of the conduit and in angular relationship to a plane normal to the longitudinal axis of the conduit. The crimps 24 and 25 have a generally like configuration to the crimps 14 and 15 and are also right-handed. Adjacent the third pair of opposed crimps 24 and 25 is a fourth set of opposed crimps 30 and 31 having troughs 32 and 33, respectively. The crimps 30 and 31 have their peaks 32 and 33 generally coplanar with a plane containing the axis of the conduit and the peaks 21 and 22 of the crimps 19 and 20. The crimps 30 and 31 are of left-handed configuration.

It is essential and critical to the operation of the present invention that the crimps in the tubing be disposed at an angular relationship both to the longitudinal axis and to a plane normal to the longitudinal axis. The precise angular deviation of the peak for liquid mixers usually is between about 30 and 70° and beneficially between about 35 and 55°. The deviation being measured by the angular displacement of the peak or trough from the longitudinal axis of the conduit. For a tube of given diameter, the greater the angular deviation, more pairs of crimps per unit length may be formed in a tube and thus an increased number of mixing stages are obtained. However, employing a lesser angle, higher flow velocities may be utilized before turbulent flow occurs.

In FIGURE 2 there is depicted an alternate embodiment of the invention generally designated by the reference numeral 40. The embodiment 40 comprises in cooperative combination a hollow tubular body 41 having a longitudinal axis. A plurality of crimps are formed in the wall 42 of the body 41. A first pair of crimps 43 and 44 of right-handed configuration are disposed adjacent a second pair of opposed crimps 45 and 46. A third pair of crimps 47 and 48 having the configuration of the crimps 43 and 44 is disposed adjacent the crimps 45 and 46, the general arrangement of the crimped portions being that as is shown in FIGURE 1. A tube or conduit 50 is disposed within the tubular body 41 and is in contact with each of the crimps 43, 44, 45, 46, 47 and 48. The tube 50 has a first end 51 and a second end 52 which extends generally radially outwardly from the axis of the tube 41. The conduit 50 extends generally the entire length of the crimped portion of the body 41. A jacket 53 is disposed about the crimped portion of the body 41. The jacket 53 and the wall 42 of the body 41 define a generally hollow cylindrical space 54. The space 54 is in communication with fluid flow passages 55 and 56.

The embodiment of FIGURE 2 constitutes a heat exchanger wherein a liquid such as a viscous liquid is passed through the conduit 41 and heat exchange fluids or fluid is passed through the conduit 50 and the jacket 53. The mixing action caused by the crimps or baffles redistributes and arranges the liquid in such a manner that excellent heat transfer is obtained. As the mixing action is generally independent of the throughput rate, at least within the region of streamline flow, a desired degree of temperature uniformity and mixing is readily achieved.

Interfacial surface generators in accordance with the present invention are particularly advantageous in that they may be readily fabricated from glass, metal or thermoplastic tubes by relatively simple forming action. For example, the interfacial surface generator of FIGURE 1 is readily prepared from ductile metallic tubing such as steel, copper or aluminum tubing with the aid of a punch press wherein each jaw of the press is provided with an elongate work engaging piece corresponding to the troughs 14 and 15. The tube is passed through a tubular guide, the punch press closed to form the crimps 14 and 15, the tube advanced to form the third crimps, fifth, seventh and ninth crimps, the direction of the elongated pipe within the press altered by 90° and the second, fourth, sixth, eighth, etc. crimps disposed between the right handed crimps. Alternately, by indexing the jaws of the punch press and rotating the tube being formed, first, second, third, fourth, fifth, etc., crimps are rapidly formed. In forming such crimps in glass or other thermoplastic material, localized heating is readily employed and the crimps formed. In order to avoid a path along the axis of the interfacial surface generator which permits undeflected flow of material from an inlet to an outlet end, it is generally desirable that the opposed crimps contact each other. However, the necessity for this can be avoided by asymmetrically crimping the conduit, that is, forming some crimps deeper or less deep than others in such a way that a straight center path does not exist.

Beneficially, the embodiment of FIGURE 2 provides an excellent heat exchange apparatus of relatively simple construction. The central conduit 50 is readily positioned within the tube 40 and the crimps formed in the conduit 41 in such a manner that they support and rigidly secure the conduit 50 therein. The presence of the conduit eliminates an undesired central path and excellent mixing is obtained. Due to the movement of the fluid within the conduit 41 caused by the crimps, various portions of the conduit are brought into contact with the central conduit 51 and into contact with the inner wall of the conduit 41 within the jacket 53. Such a configuration permits rapid heat exchange even when very viscous liquids are employed and a high degree of uniformity is obtained.

Beneficially, the interfacial surface generator of FIGURE 1 is also readily incorporated within a temperature controlled bath or heat exchange fluid jacket.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the persent invention, excepting as it is set forth and defined in the hereto-appended claims.

What is claimed is:
1. An interfacial surface generator comprising
   a hollow tubular conduit defining an internal longitudinal passageway, the conduit having
   a wall, the wall defining
   a plurality of opposed crimps, the crimps being disposed in angular relationship to the longitudinal axis of the conduit and forming an angle therewith substantially less than 90° and being in angular opposition to each other, the crimps having
   troughs, a portion of each of the troughs of opposed crimps being in closely adjacent relationship, the opposed pairs of crimps being of alternating right handed and left handed configuration, the right handed and left handed crimps being disposed generally in planes which contain the longitudinal axis of the conduit, the plane of the troughs of the right handed crimps being disposed in angular relationship to the plane at the left handed crimps.

2. The interfacial surface generator of claim 1 wherein each crimp has a generally V-shaped configuration.

3. The interfacial surface generator of claim 1 including an inner conduit generally centrally disposed within the conduit and maintained in position by means of the crimps.

4. The interfacial surface generator of claim 3 including means to pass a fluid through the inner conduit.

5. The interfacial surface generator of claim 4 including means defining an external jacket about the crimped portion of the conduit adapted to permit flow of heat exchange fluid between said conduit and jacket.

References Cited

UNITED STATES PATENTS

| 1,922,838 | 8/1933 | Bossart | 165—177 |
| 2,016,720 | 10/1935 | Krause | 138—38 |
| 2,663,321 | 12/1953 | Jantsch | 138—38 |
| 2,993,682 | 7/1961 | Huet | 165—141 X |
| 3,239,197 | 3/1966 | Tollar | 259—4 |

FOREIGN PATENTS 242,218  11/1910  Germany.

ROBERT A. O'LEARY, *Primary Examiner.*

A. W. DAVIS, JR., *Assistant Examiner.*